United States Patent [19]

Ohsawa

[11] 3,753,120

[45] Aug. 14, 1973

[54] CONTROL SIGNAL GENERATING CIRCUIT

[75] Inventor: Mitsuo Ohsawa, Kanagawa-ken, Japan

[73] Assignee: Sony Corporation, Tokyo, Japan

[22] Filed: May 11, 1971

[21] Appl. No.: 142,827

[52] U.S. Cl. ................. 325/455, 325/398, 325/344, 329/179, 334/31, 334/36

[51] Int. Cl. ............................................. H03j 1/02

[58] Field of Search .................... 325/318, 319, 363, 325/344, 345, 347–349, 398, 455, 67; 307/260–263, 317; 324/131, 132; 334/30–31, 36; 329/179

[56] References Cited

UNITED STATES PATENTS

| | | | |
|---|---|---|---|
| 2,900,499 | 8/1959 | Blasbaly | 325/363 |
| 3,333,201 | 7/1967 | Hopengarten | 325/455 |
| 3,038,072 | 6/1962 | Providfit | 325/319 |
| 3,526,838 | 9/1970 | Banick | 325/455 |
| 2,499,429 | 3/1950 | Toth | 325/398 |

*Primary Examiner*—Benedict V. Safourek
*Assistant Examiner*—William T. Ellis
*Attorney*—Lewis H. Eslinger, Alvin Sinderbrand and Curtis, Morris & Safford

[57] ABSTRACT

A control signal generating circuit for a frequency modulation receiver having a plurality of intermediate-frequency stages includes:a bandpass amplifier circuit, a circuit for rectifying an output signal of bandpass amplifier circuit to produce a bias signal, and a detector circuit for rectifying an intermediate-frequency signal to produce a control signal. The detector circuit is controlled by the bias signal. The amplitude of the control signal is a function of the intensity of a frequency modulated signal received by the frequency modulation receiver.

10 Claims, 8 Drawing Figures

INVENTOR.
MITSUO OHSAWA

INVENTOR.
MITSUO OHSAWA

INVENTOR
MITSUO OHSAWA

INVENTOR.
MITSUO OHSAWA

CONTROL SIGNAL GENERATING CIRCUIT

BACKGROUND OF THE INVENTION

1. Field of the Invention

The present invention relates to a control signal generating circuit for FM receivers, and more particulary to a control signal generating circuit for producing a control signal having an amplitude proportional to the field intensity of a received signal.

2. Description of the Prior Art

In conventional FM receivers a tuning meter is driven by a unidirectional signal which is produced by rectifying an intermediate-frequency (IF) signal. However, the IF amplifier of an FM receiver also functions as a limiter, so that a control signal having a peak value at an optimum tuning point cannot be obtained and the optimum tuning point therefore cannot be indicated by the tuning meter. To make the tuning indication more precise, it is also considered possible to supply an IF signal to a narrow bandpass amplifier, rectify the output therefrom and drive the tuning meter with the rectified output. However, the dynamic range of the narrow bandpass amplifier cannot be increased, so that the rectified output for driving the tuning meter cannot produce a sharply defined peak value at an optimum tuning point in the field intensity exceeding the saturation level of the narrow bandpass amplifier. Therefore, an accurate tuning point cannot be indicated.

SUMMARY OF THE INVENTION

The present invention is to eliminate the aforementioned defects by applying an IF signal to a narrow bandpass amplifier, rectifying the output thereof to produce a control signal and using this control signal to control the operation of a detector circuit that detects the wideband IF signals.

Since the amplitude of a control signal obtained with the circuit of this invention is proportional to the field intensity of a received broadcast wave, the use of the control signal to actuate a tuning meter or indicator not only enables optimum tuning to be obtained but also indicates the field intensity. Further, it is also possible to achieve "muting," "stereo-monaural change-over" and so on as functions of the field intensity by the use of the control signal.

DESCRIPTION OF THE PREFERRED EMBODIMENTS

Figure 1:
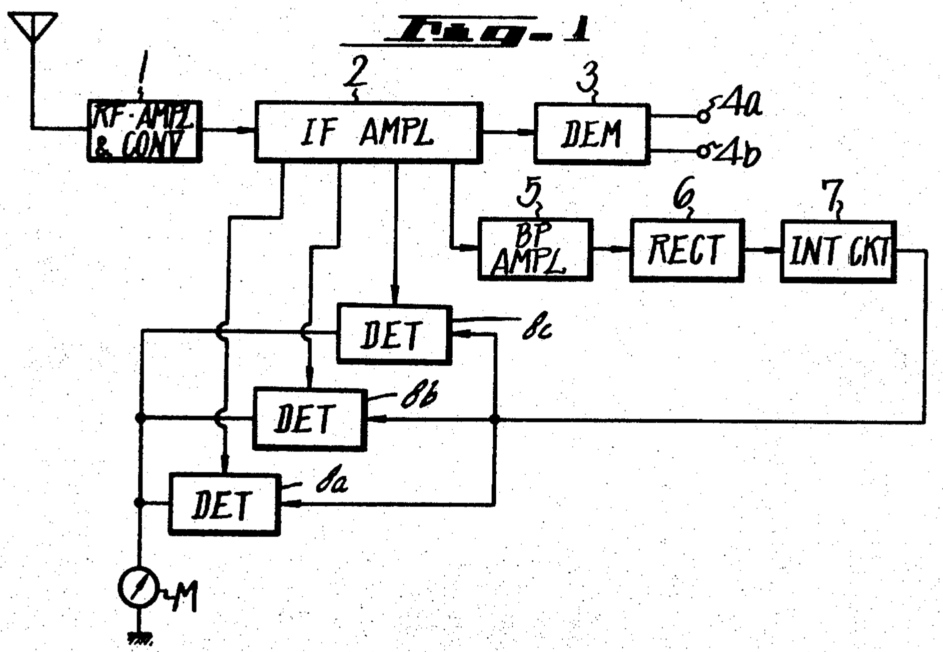
FIG. 1 is a block diagram showing one example of a circuit of this invention.

FIG. 1 shows one example of this invention as applied to a tuning meter. The circuit includes a radio-frequency (RF) amplifier circuit and a frequency converter circuit 1, an IF amplifier 2 consisting of a plurality of IF stages, and a demodulator 3, which produces right and left channel audio signals at its output terminals 4a and 4b, respectively.

One portion of an IF signal is supplied one of the final stages of the IF amplifier 2 to a narrow bandpass amplifier 5 whose band characteristic is narrower than that of the intermediate-frequency amplifier 2. The output of the amplifier 5 is applied to a rectifier circuit 6, and the rectified signal therefrom is applied through an 6 to a plurality of detector circuits 8a, 8b and 8c. The detector circuits 8a, 8b and 8c are supplied with IF signals derived from different stages of the intermediate-frequency amplifier 2 the circuit 8a being connected to one of the earlier stages, the circuit 8c being connected to one of the later stages, and the circuit 8b to a middle stage of the IF amplifier 2. The detector circuits 8a, 8b and 8c are controlled by a rectified signal dependent upon the bandpass characteristic of the narrow bandpass amplifier 5 and outputs of the detector circuits 8a, 8b and 8c are added together and then supplied to a tuning meter M.

Figure 2:
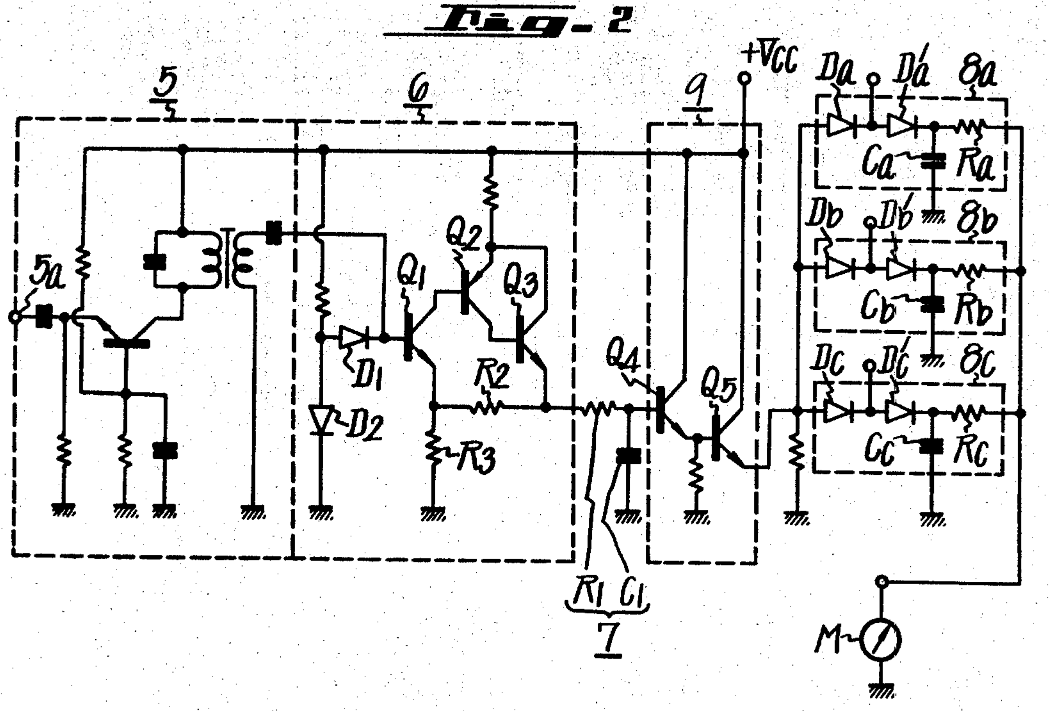
FIG. 2 is a schematic circuit diagram illustrating one specific embodiment of the principal part of the circuit of this invention.

FIG. 2 illustrates a specific schematic diagram of the principal part of the circuit depicted in FIG. 1, in which an IF signal that is fully amplitude-limited, for example, an amplified output of the last stage of the intermediate-frequency amplifier 2, is supplied to an input terminal 5a and is amplified by the narrow bandpass amplifier 5. Accordingly, an output voltage which has a peak value at a predetermined level at an optimum tuning point is derived at the output side of the narrow bandpass amplifier 5 irrespective of the level of an antenna input.

The output of the narrow bandpass amplifier 5 is applied to the rectifier circuit 6. The rectifier circuit 6 is designed to function as a voltage multiplying rectifier due to a diode $D_1$ and the diode characteristic between the base and emitter of a transistor $Q_1$. The rectified output of the rectifier circuit 6 is amplified by transistors $Q_2$ and $Q_3$ and then applied to the integrator circuit 7 consisting of a resistor $R_1$ and a capacitor $C_1$. Two resistors $R_2$ and $R_3$ form a negative feedback connection from the output of the rectifier circuit 6 to the transistor $Q_1$. The feedback is proportional to the input to the circuit 6. A diode $D_2$ biases the base of the transistor $Q_1$ to hold it in such condition that the transistor $Q_1$ is ready to conduct in the absence of a signal.

The output of the integrator circuit 7 is supplied to the base of a transistor $Q_4$ connected as an emitter follower. This transistor and a transistor $Q_5$ make up a bias voltage generating circuit 9. The output derived at the emitter of the transistor $Q_4$ is supplied to the base of the transistor $Q_5$, which is also connected as an emitter follower. Thus, the transistor $Q_5$ becomes a DC power source of extremely low internal impedance to provide at its output a DC output dependent upon the band characteristic of the narrow bandpass amplifier 5.

The detector circuits 8a, 8b and 8c comprise series circuits of diodes Da and Da', Db and Db' and Dc and Dc' and resistors Ra, Rb and Rc, respectively. Capacitors Ca, Cb and Cc are connected from ground to the junction between the diodes Da', Db' and Dc' and the resistors Ra, Rb and Rc, respectively. Amplified and amplified signals of the respective stages of the IF amplifier 2 are supplied to the connection points of the diodes Da and Da', Db and Db' and Dc and Dc'.

With such an arrangement, the rectifying efficiency of each of the detector circuits 8a, 8b and 8c is held very low unless supplied with a bias from the bias voltage generating circuit 9. This may well be achieved by using silicon diodes for the diodes Da, Da', Db, Db', Dc and Dc'. The rectifying efficiency rapidly increases when supplied with a bias, so that the rectifying efficiency is in proportion to the value of the bias.

Figure 3:
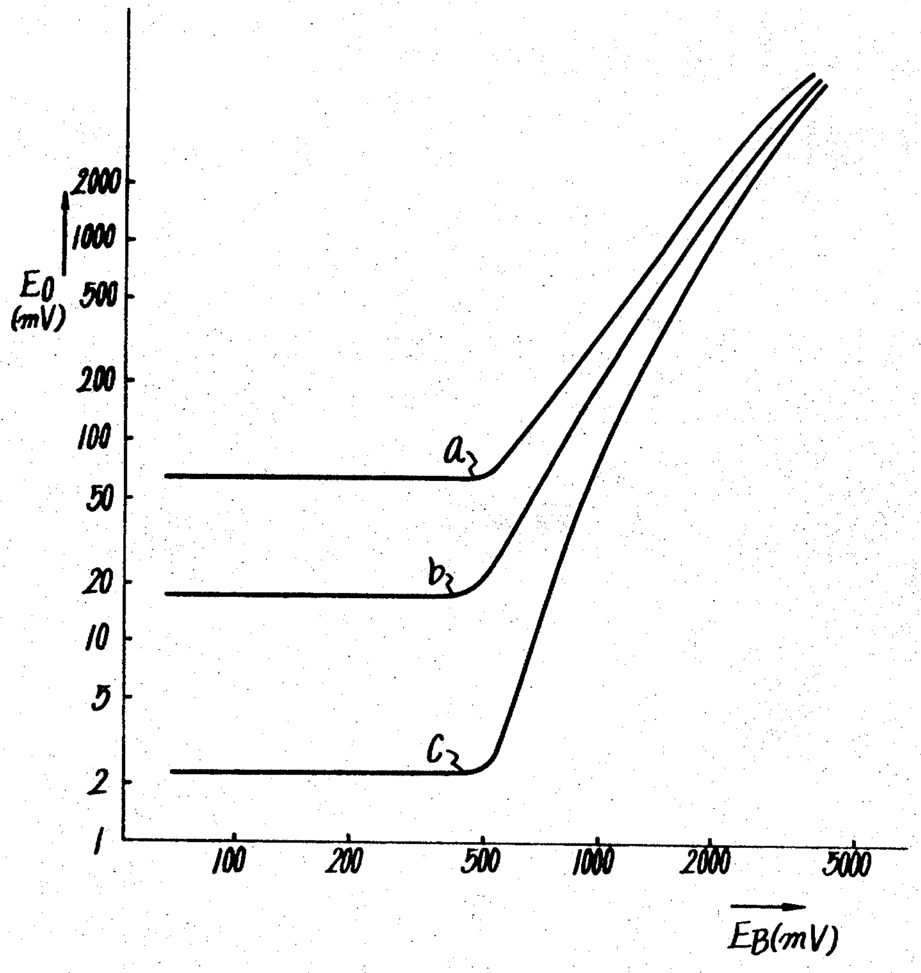
FIGS. 3 to 5, inclusive, are graphs for explaining the operation of the circuit shown in FIG. 2.

In FIG. 3 curves *a*, *b* and *c*, respectively, show characteristics of rectified output voltages $E_O$ of the detector circuits 8*a*, 8*b* and 8*c* relative to a bias voltage $E_B$ applied thereto. Changing only the bias voltage $E_B$ and holding the input levels of the IF signals to the detector circuits 8*a*, 8*b* and 8*c* constant, the rectified output voltage $E_O$ abruptly increases when the bias voltage exceeds a certain value. In this case, the bias voltage $E_B$ varies with the band characteristic of the narrow bandpass amplifier 5 as the receiver is tuned to an incoming signal, so that a maximum bias voltage is obtained at an optimum tuning point. Even if the antenna input varies a little, the maximum bias voltage is not changed by the limiter action unless the tuning point is shifted.

Once optimum tuning has been established, a bias voltage of a predetermined level is obtained irrespective of the antenna input level. As a result of this, the rectifying efficiency of the detector circuits 8*a*, 8*b* and 8*c* is enhanced by the bias voltage to provide for constant rectifying efficiency, and rectified outputs are derived from the detector circuits 8*a*, 8*b and 8c*. The tuning meter M is driven by the rectified outputs, and hence indicates a peak value at an optimum tuning point, allowing ease in tuning with accuracy.

The detector circuits 8*a*, 8*b* 8*c* are supplied with the IF signals whose levels become increasingly higher, so that even if the circuits are supplied with the same bias voltage, their rectified outputs $E_O$ become increasingly greater in proportion to the levels of the inputs thereto, as will be seen from the curves *a*,*b* and *c* in FIG. 3. As a result, the rectified output voltages $E_O$ vary with the antenna input level.

Figure 4:
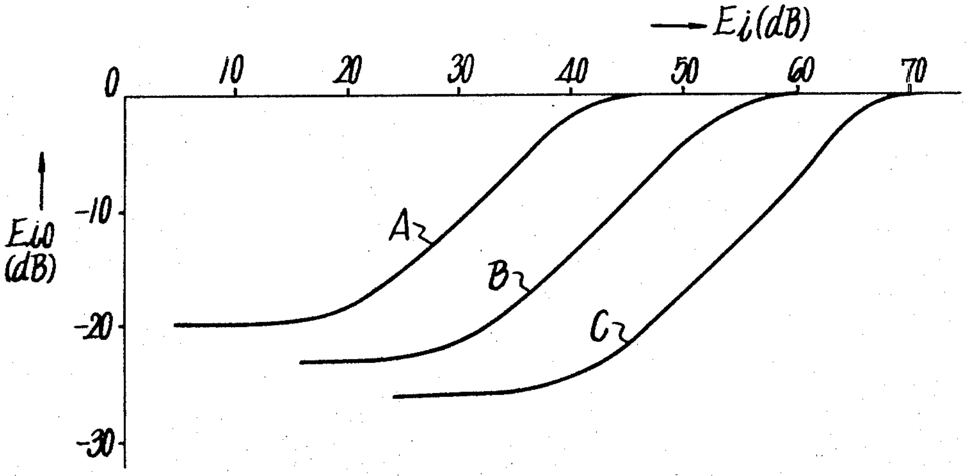

This will hereinbelow be described in connection with FIGS. 4 and 5. FIG. 4 shows an output $E_{i0}$ of each stage of the IF amplifier relative to the antenna input level $E_i$, curves A, B and C indicating input-output characteristics of the later intermediate and earlier stages of the amplifier 2, respectively. As the antenna input level $E_i$ increases, the output levels of the respective stages of the intermediate-frequency amplifier are sequentially saturated from the latter stage by the limiter action.

Figure 5:
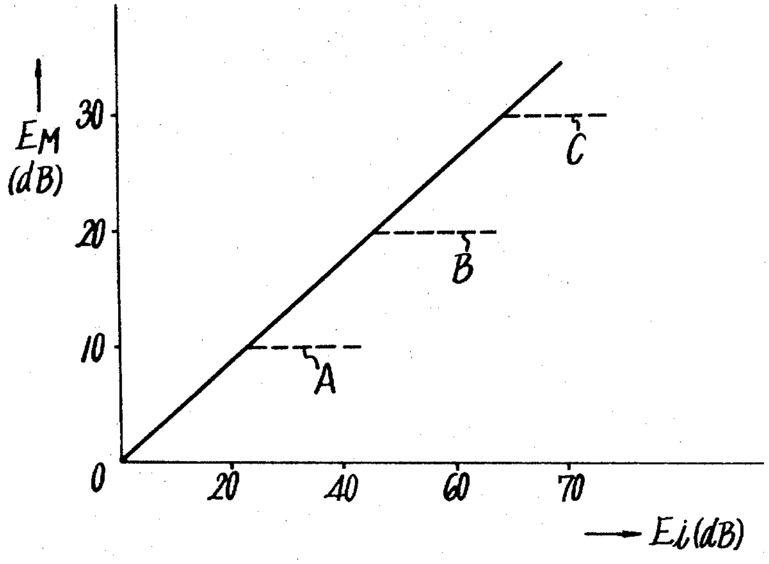

Accordingly, when the outputs of the respective stages of the IF amplifier are added together after being rectified, the amplitude of the added signal level $E_M$ becomes proportional to the antenna input level $E_i$ as depicted in FIG. 5. Since this added signal is supplied to the tuning meter M, the indication of the meter M is also proportional to the antenna input. Thus, the tuning meter M also functions as a field intensity meter.

Figure 6:
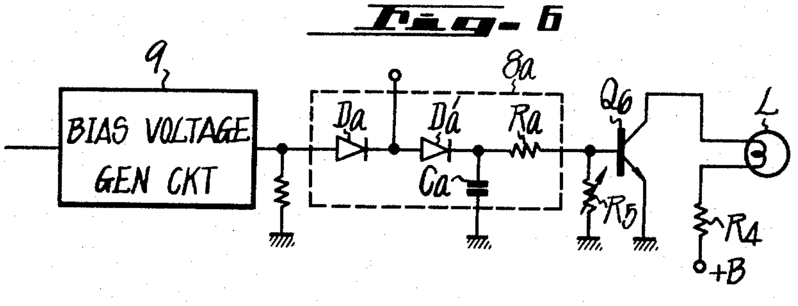
FIGS. 6 and 7 are schematic circuit diagrams illustrating other examples of the circuit of this invention.

The foregoing example employs three detector circuits but, if only tuning indication is desired the number of the detector circuits may well be reduced to one as shown in FIG. 6 because the rectified output is produced only at the time of tuning operation. In the example of FIG. 6 the base of a transistor $Q_6$ is connected to the output side of the detector circuit 8*a* and its collector is connected to a power source +B through a lamp L and a resistor $R_4$ and its emitter is grounded. A variable resistor $R_5$ is connected between the base of the transistor $Q_6$ and ground and by adjusting the variable resistor $R_5$ the transistor $Q_6$ can be turned on only when a rectified output exceeding a predetermined value is produced. Accordingly, it is possible to turn on the transistor $Q_6$ to light the lamp L only when precise tuning is obtained. Thus, the circuit of the present example allows ease in tuning operation. In conventional FM receivers a lamp is lighted in the vicinity of an optimum tuning point, and accordingly indication of accurate tuning is cannot be achieved. However, the circuit of this invention produces the rectified output only when an output is derived from the narrow bandpass amplifier, namely when complete tuning is achieved, so that accurate tuning can be effected.

Figure 7:
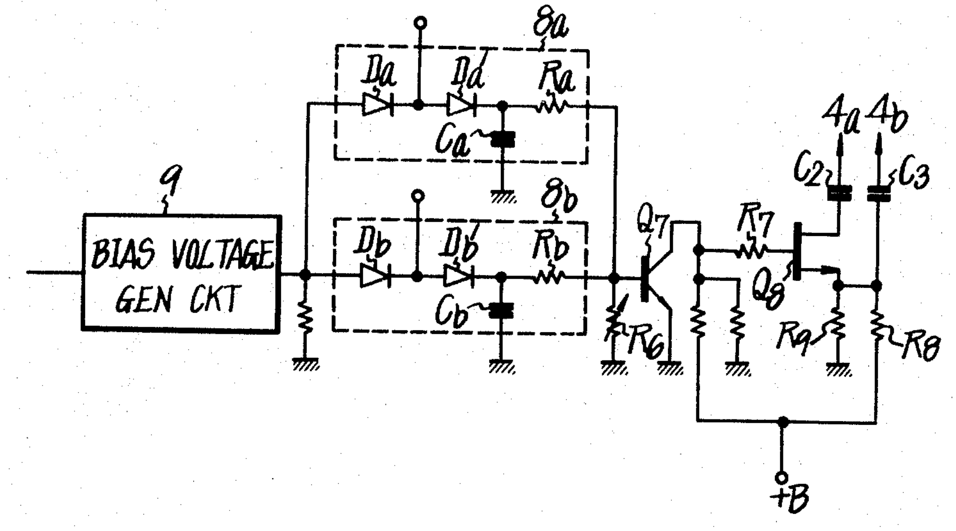

FIG. 7 illustrates another modified form of this invention as applied to a circuit that automatically reduces noise signals generated at the time of receiving a low field intensity signal. These noise signals are rendered imperceptible by the use of a control signal.

The outputs of the detector circuits 8*a* and 8*b* are supplied to the base of a transistor $Q_7$, which becomes conductive when the output of each of the detector circuits or a control signal exceeds a value determined by a variable resistor $R_6$ connected between the base of the transistor $Q_7$. The collector of the transistor $Q_7$ is connected to the gate of a field effect transistor $Q_8$ through a resistor $R_7$. The drain and source electrodes of the field effect transistor $Q_8$ are respectively connected through capacitors $C_2$ and $C_3$ to the stereophonic signal output terminals 4*a* and 4*b* in FIG. 1. The source electrode of the field effect transistor $Q_8$ is connected to the junction between a series circuit comprising resistors $R_8$ and $R_9$ connected to a power source +B. The source electrode of the field effect transistor $Q_8$ is supplied with a voltage to turn it off when its gate electrode is grounded.

Figure 8:
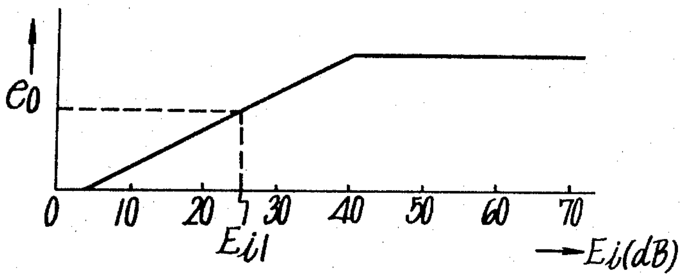
FIG. 8 is a graph for explaining the operation of the circuit depicted in FIG. 7.

Now FIG. 8 is a graph showing the relation of the control signal to the antenna input $E_i$. The variable resistor $R_6$ is adjusted in such a manner that the transistor $Q_7$ turns on when the input exceeds a value $E_{i1}$. Accordingly, under normal receiving condition the transistor $Q_7$ is switched on by the control signal to ground the gate of the field effect transistor $Q_8$, so that the field effect transistor $Q_8$ is held in the off state and does not exert any influence between the terminals 4*a* and 4*b*. If the antenna input is lower than $E_{i1}$, the transistor $Q_7$ is in the off state and the field effect transistor $Q_8$ is turned on, and consequently a series circuit comprising the capacitors $C_2$ and $C_3$ becomes connected between the terminals 4*a* and 4*b*. As a result of this, the frequency components passing through the capacitors $C_2$ and $C_3$ are mixed together to provide a monaural signal, and the levels of the frequency components are also lowered. According to my experiments, when the values of the capacitors $C_2$ and $C_3$ were selected to permit the passage therethrough of signals of a frequency higher than 7 KHz, white noises generated at the time of receiving a low field intensity signal were markedly decreased without imparing the stereophonic effect. Further, the circuit of this example similarly reduces white noise produced due to detuning. In particular, the control signal rapidly decreases except at the time of complete tuning, and hence is useful for the reduction of white noise which is likely to be generated when tuning is shifted a little.

It will be apparent that many modifications and variations may be effected without departing from the scope of the novel concepts of this invention.

I claim as my invention

1. In a frequency modulation receiver having a relatively wide band intermediate-frequency amplifier, to produce an intermediate frequency signal and a demodulator to convert said intermediate frequency signal to an audio signal a control signal generating circuit comprising a bandpass circuit having a narrower frequency band than that of said intermediate-frequency amplifier, means for applying an intermediate-frequency signal to said bandpass circuit, means for rectifying an output signal of said bandpass circuit to produce a bias signal, a detector circuit connected to said intermediate-frequency amplifier in addition to said demodulator for rectifying an intermediate-frequency signal to produce a control signal representative of the tuned condition, and means for connecting said bias signal to said detector circuit to control the operation of said detector circuit.

2. A control signal generating circuit as claimed in claim 1 wherein said detector circuit includes means activated by the bias signal to generate said control signal only in the presence of said bias signal.

3. A control signal generating circuit as claimed in claim 1 wherein said detector circuit comprises a rectifying diode, an integrator circuit and a bias signal supplying diode.

4. A control signal generating circuit as claimed in claim 3 wherein said rectifying diode has its cathode connected to said integrator circuit and its anode connected to said bias signal supplying diode, and said intermediate-frequency amplifier and said means to produce the bias signal respectively are connected to the cathode and anode of said bias signal supplying diode.

5. In a frequency modulation receiver comprising a plurality of intermediate-frequency stages having a relatively wide band to produce an intermediate frequency signal and a demodulator to convert said intermediate frequency signal to an audio signal, a control signal generating circuit comprising a bandpass circuit having a narrower frequency band than that of said intermediate-frequency stages, means for applying an intermediate-frequency signal from one of said intermediate-frequency stages to said bandpass circuit, means for rectifying an output signal of said bandpass circuit to produce a bias signal, a plurality of detector circuits in addition to said demodulator connected to separate ones of said intermediate-frequency stages to supply different signal levels thereto, means for applying said bias signal to each of said detector circuits to control the operation of said detector circuits, and means connected to said detector circuits for adding output signals of said detector circuits to produce a control signal representative of the tuned condition.

6. A control signal generating circuit as claimed in claim 5 wherein the rectifying means comprises an integrator circuit.

7. A control signal generating circuit as claimed in claim 5 wherein each of said detector circuits comprises two diodes connected in series with each other, and an integrator circuit, one end of said diode series connection being connected to said integrator circuit and said intermediate-frequency amplifier and said means to produce the bias signal being connected to the connection point between the two diodes and to the other end of said diode series connection, respectively.

8. A frequency modulation receiver comprising an intermediate-frequency amplifier having a relatively wide band to produce an intermediate frequency signal and a demodulator to convert said intermediate frequency signal to an audio signal, a band pass circuit for an intermediate frequency signal having a narrower frequency band than that of said intermediate-frequency amplifier, means for applying an intermediate-frequency signal from said intermediate-frequency amplifier to said bandpass circuit, means for rectifying an output signal of said bandpass circuit to produce a bias signal, a detector circuit connected to said intermediate-frequency amplifier is addition to said demodulator for rectifying an intermediate-frequency signal therefrom, means for applying said bias signal to said detector circuit to control the operation of said detector circuit, and means connected to said detector circuit for indicating the intensity of a control signal derived therefrom.

9. A frequency modulation receiver as claimed in claim 8 wherein the indicating means is a meter.

10. A frequency modulation receiver as claimed in claim 8 wherein the indicating means comprises a transistor and a lamp driven by said transistor.

* * * * *

UNITED STATES PATENT OFFICE

CERTIFICATE OF CORRECTION

Patent No. 3,753,120 Dated August 14, 1973

Inventor(s) Mitso Ohsawa

It is certified that error appears in the above-identified patent and that said Letters Patent are hereby corrected as shown below:

In the heading, insert:

(30) Foreign Application Priority Data

May 15, 1970 Japan-----41847/70

Signed and sealed this 18th day of December 1973.

(SEAL)
Attest:

EDWARD M.FLETCHER,JR.
Attesting Officer

RENE D. TEGTMEYER
Acting Commissioner of Patents